United States Patent
Jiang et al.

(10) Patent No.: US 8,467,423 B2
(45) Date of Patent: Jun. 18, 2013

(54) THULIUM AND/OR HOLMIUM DOPED GERMANOSILICATE GLASSES FOR TWO MICRON LASERS

(75) Inventors: Shibin Jiang, Tucson, AZ (US); Tao Luo, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

(21) Appl. No.: 13/400,508

(22) Filed: Feb. 20, 2012

(65) Prior Publication Data

US 2012/0269210 A1     Oct. 25, 2012

Related U.S. Application Data

(63) Continuation-in-part of application No. 12/113,865, filed on May 1, 2008, now Pat. No. 8,121,154.

(51) Int. Cl.
*H01S 3/30*     (2006.01)

(52) U.S. Cl.
USPC .................................................. 372/6

(58) Field of Classification Search
USPC .................................................. 372/6
See application file for complete search history.

(56) References Cited

U.S. PATENT DOCUMENTS

| 7,298,547 B1 | 11/2007 | Jiang et al. |
| 7,298,768 B1 | 11/2007 | Jiang et al. |
| 2002/0041436 A1* | 4/2002 | Kondo et al. ............ 359/341.5 |

* cited by examiner

*Primary Examiner* — Yuanda Zhang
(74) *Attorney, Agent, or Firm* — Dale F. Regelman; Nikia L. Gray; Quarles & Brady LLP

(57) ABSTRACT

A laser glass fiber with a core of the fiber comprising a germanosilicate glass host, one or more glass network modifiers, one or more glass network intermediators, and Thulium ions, Holmium ions, or a combination of Thulium ions and Holmium ions. The fiber emits laser light from 1.7 micron to 2.2 micron.

10 Claims, 11 Drawing Sheets

FIG. 1C
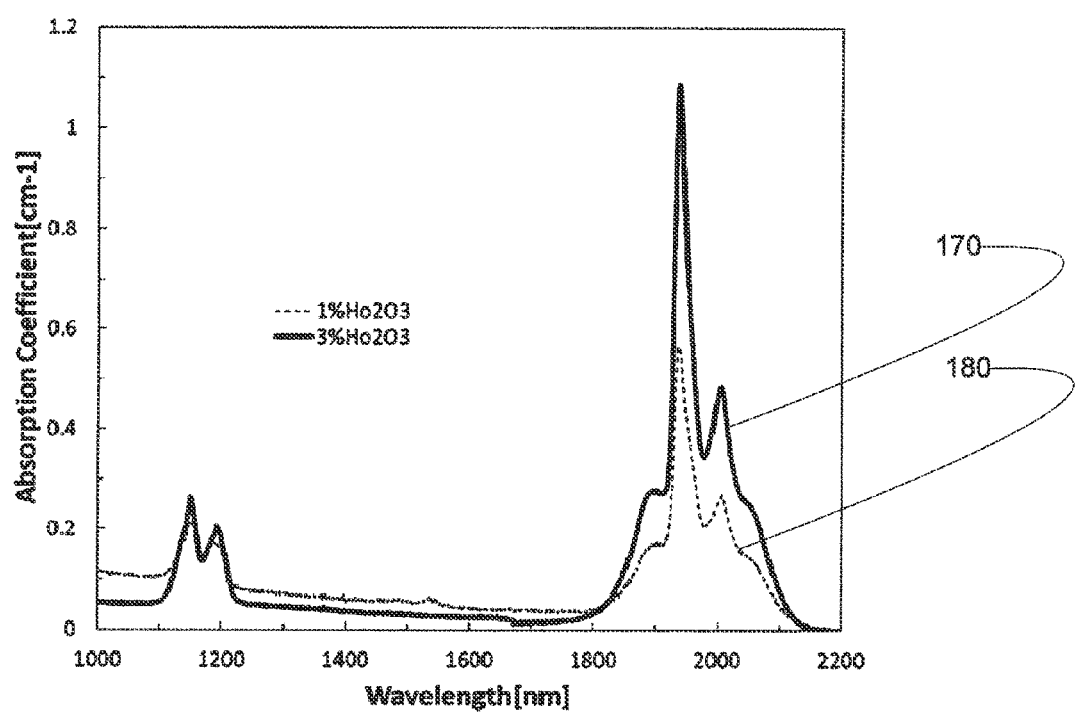
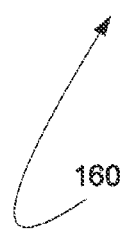

200

FIG. 3
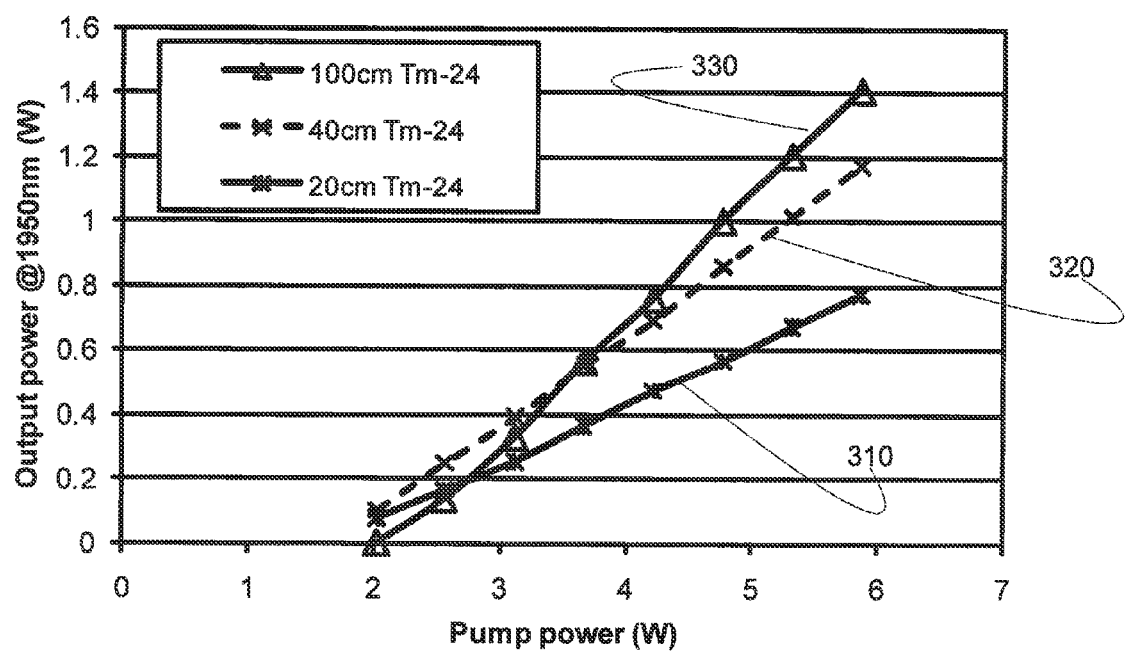

FIG. 9
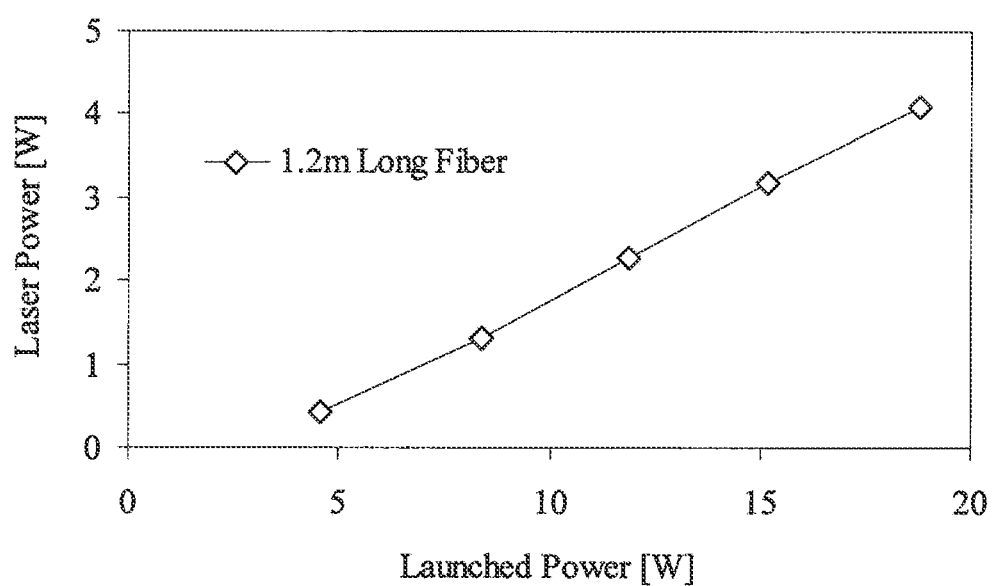
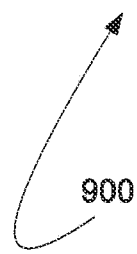

US 8,467,423 B2

THULIUM AND/OR HOLMIUM DOPED GERMANOSILICATE GLASSES FOR TWO MICRON LASERS

CROSS-REFERENCE TO RELATED APPLICATIONS

This application is a continuation-in-part of U.S. patent application Ser. No. 12/113,865 filed May 1, 2008, entitled "Thulium and/or Holmium Doped Silicate Glasses for Two Micron Lasers" to Shibin Jiang and claims priority under 35 U.S.C. §120 to the same. U.S. patent application Ser. No. 12/113,865 is hereby incorporated by reference herein.

FIELD OF THE INVENTION

This invention relates to glasses and fibers for laser applications. More specifically, this invention is directed to Thulium-doped, Holmium-doped, and Thulium/Holmium co-doped germanosilicate glasses for near 2 micron fiber lasers with high quantum efficiency.

BACKGROUND OF THE INVENTION

Near 2 micron fiber lasers are of great interest because of the potential possibility of combining high output power and retina safety together, which are needed for a wide variety of commercial and military applications including materials process, remote sensing, and bio-medical application. Due to the stronger absorption of many materials containing water molecules and organic materials at 2 micron than at 1 micron, less power of 2 micron fiber laser is needed compared to 1 micron fiber laser in order to achieve the same effect. More importantly, 2 micron is classified as retina safe wavelength (frequently called as eye-safe laser), which is much safer than 1 micron laser. Up to now, majority of the high power fiber laser development focus on 1 micron $Yb^{3+}$-doped fiber laser.

SUMMARY OF THE INVENTION

Considering the inherent critical drawbacks associated with silica and germanate glass fibers, Applicants have prepared highly $Tm^{3+}$-doped, $Ho^{3+}$-doped, and $Tm^{3+}/Ho^{3+}$-doped germanosilicate glass fiber for 2 micron fiber laser application. By "germanosilicate glass," Applicants mean multi-component glass with a first network former of $SiO_2$ and a second network former of $GeO_2$. In contrast to silica glass, germanosilicate glass contains glass network modifiers such as alkali ions and alkaline metal ions, and glass network intermediates such as aluminum oxide and boron oxide in addition to glass network formers of $SiO_2$ and $GeO_2$. In most cases, the content of $SiO_2$ is not higher than 70 mole percent and the content of $GeO_2$ is not higher than 70 mole percent in germanosilicate glasses.

Applicants have found that high concentration of rare-earth oxides can be doped into silicate and germanosilicate glasses without the so-called ion-clusters mainly because of the glass network modifiers. The glass network modifiers, such as sodium ions, potassium ions, barium ions, and calcium ions, break the well-defined glass network of silica, thereby producing sites for rare-earth ions. Applicants have found that silicate and germanosilicate glass fiber exhibits numerous advantages over silica fiber, germanate glass fiber and other multi-component glass fibers as the host for highly efficient and high power fiber laser near 2 microns.

BRIEF DESCRIPTION OF THE DRAWINGS

The invention will be better understood from a reading of the following detailed description taken in conjunction with the drawings in which like reference designators are used to designate like elements, and in which:

FIG. 1C illustrates absorption spectra of $Ho^{3+}$-doped germanosilicate glasses with different doping concentrations;

FIG. 3 illustrates laser performance of Tm-doped germanosilicate glass fiber;

FIG. 9 illustrates laser performance of Tm/Ho co-doped germanosilicate glass fiber.

DETAILED DESCRIPTION OF THE PREFERRED EMBODIMENTS

Figure 1A:
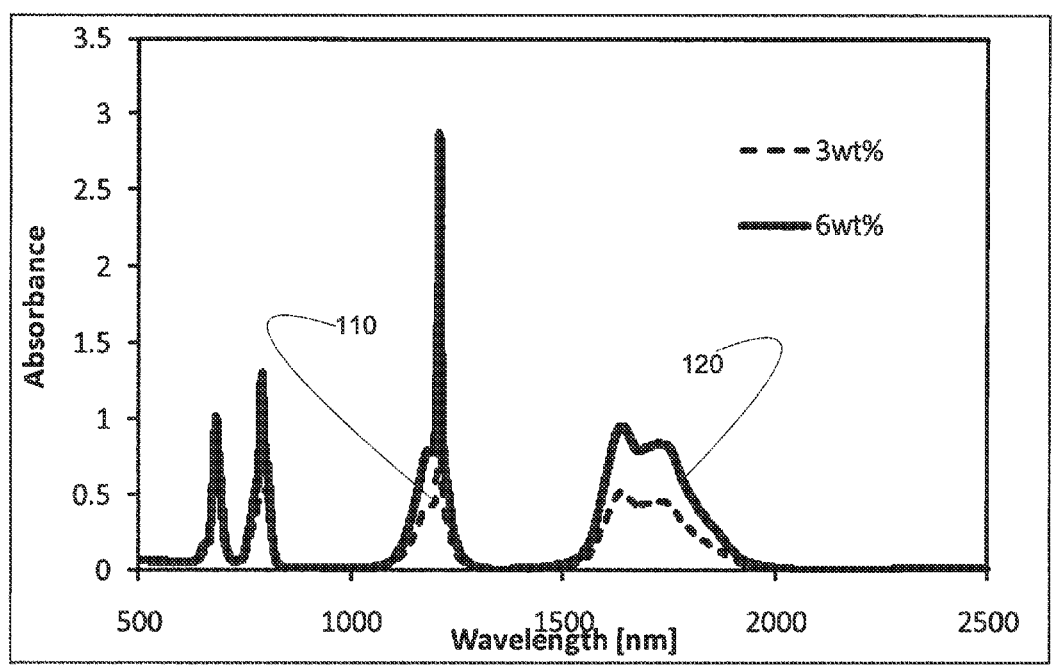
FIG. 1A illustrates absorption spectra of $Tm^{3+}$-doped germanosilicate glasses with different doping concentrations.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Near 2 micron fiber lasers can be generated from $Tm^{3+}$-doped, $Ho^{3+}$-doped, and $Tm^{3+}/Ho^{3+}$-co-doped fibers. The laser wavelengths can vary from 1.8 micron to 2.2 micron, which is generally called 2 micron fiber laser. $Tm^{3+}$-doped and $Tm^{3+}/Ho^{3+}$-co-doped fibers can be used to generate near 2 micron fiber lasers because diode lasers near 800 nm can be used as a pump source. In some cases pump lasers from 1.5 micron to 1.9 micron are used to excite the active rare-earth ions from the ground state to the lasing state, which is called in-band pumping. When a near 800 nm laser is used as pump source, the quantum efficiency can be close to 200% because of the so-called cross-relaxation process of $Tm^{3+}$ ions.

$Tm^{3+}$ cross-relaxation is a non-radiative process which occurs when the $Tm^{3+}$ doping concentration is sufficiently high in which an excited $Tm^{3+}$ in the $^3H_4$ level decays to the $^3F_4$ level and a neighboring ground-state $Tm^{3+}$ ion is excited to the $^3F_4$ level, accompanied by the emission of phonons. In $Tm^{3+}$ doped crystals the probability of $Tm^{3+}$ cross relaxation is negligible for concentration less than about 2 weight percent but approaches unity for concentrations greater than about 5 weight percent.

The cross-relaxation process has been observed in $Tm^{3+}$-doped silica fiber when the doping concentration is at least 2.2 weight percent, resulting in a quantum efficiency of 120%, and in $Tm^{3+}$-doped germanate fiber when the doping concentration is at least a 4 weight percent, resulting in a quantum efficiency of 170%. Additionally, highly efficient fiber lasers have been demonstrated using either $Tm^{3+}$-doped silica or germanate fiber by taking advantage the cross-relaxation of $Tm^{3+}$ ions. For example, by using $Tm^{3+}$-doped germanate glass fiber, a 2 μm fiber laser with more than 100 W output power and 68% slope efficiency has been demonstrated.

However, both $Tm^{3+}$-doped silica fiber and $Tm^{3+}$-doped germanate fiber suffer many problems for practical fiber laser applications. For $Tm^{3+}$-doped silica fiber specifically, the doping concentration of $Tm^{3+}$ ions is restricted to around 2.2 weight percent of $Tm_2O_3$ due to the intrinsic glass network structure, which limits the benefit of cross-relaxation of $Tm^{3+}$ ions. As a result, the efficiency is relatively low. Various approaches have been developed to increase the doping concentration, including co-doping with $Al_2O_3$, $B_2O_3$, and $P_2O_5$ and using nano-particles, however, the highest doping levels achieved are still far below the 4 to 6 weight percent required for efficient cross-relaxation energy transfer of $Tm^{3+}$ ions.

Applicants have discovered that germanosilicate glass provides significant advantages over silica glass, including that high $Tm^{3+}$ doping concentrations of rare-earth ions can be achieved in germanosilicate glass due to its less defined glass network, which enables the maximum benefit of cross-relaxation energy transfer. More specifically, Applicant has achieved $Tm^{3+}$ doping concentrations of about 2 weight percent to about 15 weight percent using germanosilicate glass. Moreover, Applicants have discovered that a quantum efficiency near 200% can be achieved when $Tm^{3+}$-doped germanosilicate fiber laser is pumped with near 800 nm laser diodes. Such high quantum efficiency results in a high slope efficiency and relatively small amount of heat.

Another significant advantage of germanosilicate glass over silica glass is that the phonon energy of germanosilicate near 950 $cm^{-1}$ is much smaller than that of near 1100 $cm^{-1}$ of silica glass. A lower phonon energy is beneficial for achieving high laser efficiency for near 2 micron fiber lasers.

Germanosilicate glass also has advantages over germanate glass, including increased mechanical and chemical strength. As will be appreciated, silicate glasses and germanate glasses comprise different glass network formers. As the bond strength of Si—O is stronger than that of Ge—O, the mechanical strength of silicate glasses typically is logically stronger than germanate glasses, and the coefficient of thermal expansion of silicate glasses is smaller. As will be appreciated, the smaller the coefficient of thermal expansion, the higher the thermal shock resistance. Furthermore, a higher thermal shock resistance and a stronger mechanical strength yields a higher pump heat induced damage threshold and laser induced damage threshold, which are critical in order to achieve high fiber laser power.

Applicants have also found that using germanosilicate glass provides numerous advantages when co-doped with $Tm^{3+}/Ho^{3+}$ or when doped with $Ho^{3+}$ alone. As mentioned, a high $Tm^{3+}$ doping concentration can produce efficient pump absorption near 800 nm and when co-doped with $Ho^{3+}$, the $Tm^{3+}$ transfers energy to Ho ions. In certain preferred embodiments, when $Tm^{3+}/Ho^{3+}$ are co-doped, the $Tm^{3+}$ doping concentration is higher that $Ho^{3+}$ doping concentration. In yet other embodiments however, the $Ho^{3+}$ doping concentration is higher or the doping concentration of the $Tm^{3+}$ and the $Ho^{3+}$ are the same. For embodiments doped with $Ho^{3+}$ only, a relatively high Ho doping concentration is very important as well in order to achieve a relatively high gain per unit length near 2 micron.

For all three embodiments, $Tm^{3+}$-doped, $Tm^{3+}/Ho^{3+}$ co-doped, and $Ho^{3+}$-doped germanosilicate glass, the expected laser wavelength is near 2 micron. For near 2 micron fiber laser a relatively lower phonon energy can produce a higher quantum efficiency, which means germanosilicate glass has a clear advantage over silica glass.

Applicants' present invention utilizes a glass host of germanosilicate glass. Germanosilicate glass is a glass having two network formers, one being $SiO_2$ and the other being $GeO_2$. As will be appreciated, the network structure of glass allows for the accommodation of different types of atoms which can significantly change the properties of the glass. Cations can act as network modifiers, disrupting the continuity of the network, or as formers, which contribute to the formation of the network. Network formers have a valence greater than or equal to three and a coordination number not larger than four. Network intermediates have a lower valence and higher coordination number than network formers. Applicants' germanosilicate glass host maintains the superior mechanical and chemical strength of silicate glass while having the similar phonon energy of germanate glass.

In certain embodiments, Applicants' germanosilicate glass host comprises from about 2.5 mole percent to about 70 mole percent $SiO_2$ and from 2.5 mole percent to about 70 mole percent $GeO_2$, where the total mole percent of the $SiO_2$ and $GeO_2$ is from about 30 mole percent to about 90 mole percent. In certain other embodiments, Applicants' germanosilicate glass host comprises from about 2.5 mole percent to about 50 mole percent $SiO_2$ and from 4.25 mole percent to about 60 mole percent $GeO_2$, where the total mole percent of the $SiO_2$ and $GeO_2$ is from about 45 mole percent to about 70 mole percent.

Using Applicants' germanosilicate glass host, Applicants have designed and fabricated a series of germanosilicate glasses which exhibit good rare-earth solubility and thermal properties. The Si—O and Ge—O bonds which form the glass host matrix can be perturbed using one or more Network Modifiers ("MO"). Generally speaking, Network Modifiers affect, inter alia, the thermal expansion, hardness, chemical durability, density, surface tension, and refractive index, of a pure germanosilicate glass. In certain embodiments, Applicants' germanosilicate glass host is modified using one or more MO materials selected BaO, CaO, MgO, ZnO, PbO, $K_2O$, $Na_2O$, $Li_2O$, $Y_2O_3$, or combinations thereof, from 5 mole percent to 40 mole percent.

In certain embodiments, Applicants' laser glass composition comprises one or more glass network intermediators (XO). A glass network intermediator modifies the host glass network, thereby creating additional dopant sites. In certain embodiments, the one or more glass network intermediators bridge some of the bonds in the network thereby increasing the network's strength and chemical durability without raising the melting temperature appreciably. In certain embodiments, Applicants' germanosilicate glass host is modified using one or more XO materials selected from $Al_2O_3$, $B_2O_3$, $La_2O_3$, or combinations thereof, from 0.5 mole percent to 40 mole percent.

Table 1 recites Applicants' glass compositions. The glass compositions recited in Table 1 can be doped with $Tm^{3+}$ only, $Tm^{3+}/Ho^{3+}$ co-doped, or $Ho^{3+}$ only.

TABLE 1

Glass compositions in mole percent

| Glass No. | SiO$_2$ | Al$_2$O$_3$ | GeO$_2$ | Li$_2$O | Na$_2$O | CaO | BaO |
|---|---|---|---|---|---|---|---|
| S-G-2-s | 55 | 2.5 | 4.25 | 3 | 3 | 16 | 16.25 |
| S-G-3-s | 45 | 2.5 | 10 | 5 | 5 | 16.25 | 16.25 |
| S-G-17-s | 55 | 4 | 4.5 | 0 | 0 | 18.25 | 18.25 |
| S-G-18-s | 50 | 4 | 9.5 | 0 | 0 | 18.25 | 18.25 |
| S-G-19-s | 44.5 | 4 | 15 | 0 | 0 | 18.25 | 18.25 |
| S-G-C-54 | 18.5 | 6 | 41.5 | 7 | 7 | 10 | 10 |
| S-G-C-60 | 35 | 6 | 25 | 7 | 7 | 10 | 10 |
| S-G-C-1-s | 35 | 6 | 25 | 7 | 7 | 10 | 10 |
| S-G-C-2-s | 35 | 6 | 25 | 7 | 7 | 2 | 18 |
| S-G-C-3-s | 35 | 6 | 25 | 7 | 7 | 2 | 18 |
| S-G-30-s | 30 | 6 | 30 | 0 | 0 | 17 | 17 |

In certain such embodiments, Applicants' germanosilicate glass has a Tm$^{3+}$ doping concentration of between about 2 weight percent to about 15 weight percent. In certain such embodiments, Applicants' germanosilicate glass has a Tm$^{3+}$ doping concentration of between about 4 weight percent to about 7 weight percent. In yet other embodiments, Applicants' germanosilicate glass has a Ho$^{3+}$ doping concentration of between about 0.1 weight percent to about 3 weight percent. In certain such embodiments, Applicants' germanosilicate glass has a Ho$^{3+}$ doping concentration of between about 0.4 weight percent to about 2 weight percent. In yet other embodiments, Applicants' germanosilicate glass co-doped with a Tm$^{3+}$ doping concentration of between about 2 weight percent to about 15 weight percent and a Ho$^{3+}$ doping concentration of between about 0.1 weight percent to about 3 weight percent. In certain such embodiments, Applicants' germanosilicate glass is co-doped with a Tm$^{3+}$ doping concentration of between about 4 weight percent to about 7 weight percent and a Ho$^{3+}$ doping concentration of between about 0.2 weight percent to about 2 weight percent.

Additionally, Applicant's germanosilicate glass exhibits excellent thermal properties as, during the fiber drawing process, the fiber preform is heated to the glass softening temperature, which is around 200° C. above the glass transition temperature. No crystallization occurs during fiber drawing process otherwise scattering loss will be introduced in the fiber.

To make Applicants' glass compositions, starting materials having a purity greater than about 99.99% are preferably utilized. The glass is melted in a platinum crucible in a resistance heated furnace. Typically, chemicals are loaded at 1300° C., and heated to 1450° C. after melting. The glass liquid is kept at around 1450° C. in liquid nitrogen protected environment in order to remove OH$^-$ groups from the glass. The glass is then cast into a preheated aluminum mold.

After the glass solidifies, it is moved into an annealing oven for annealing process to remove the cast induced stress. Glass samples can then be fabricated for characterization of thermal properties and measurement of the refractive index and absorption.

Applicants have fabricated germanosilicate glasses with doping concentrations of 2 weight percent, 3 weight percent, 4 weight percent, 5 weight percent, 6 weight percent, and 7 weight percent of Tm$_2$O$_3$. FIG. 1A illustrates absorption spectra 100 comprising spectrum 110 for a 3 weight percent Tm$_2$O$_3$ doping, and spectrum 120 for a 6 weight percent Tm$_2$O$_3$ doping.

Figure 1B:
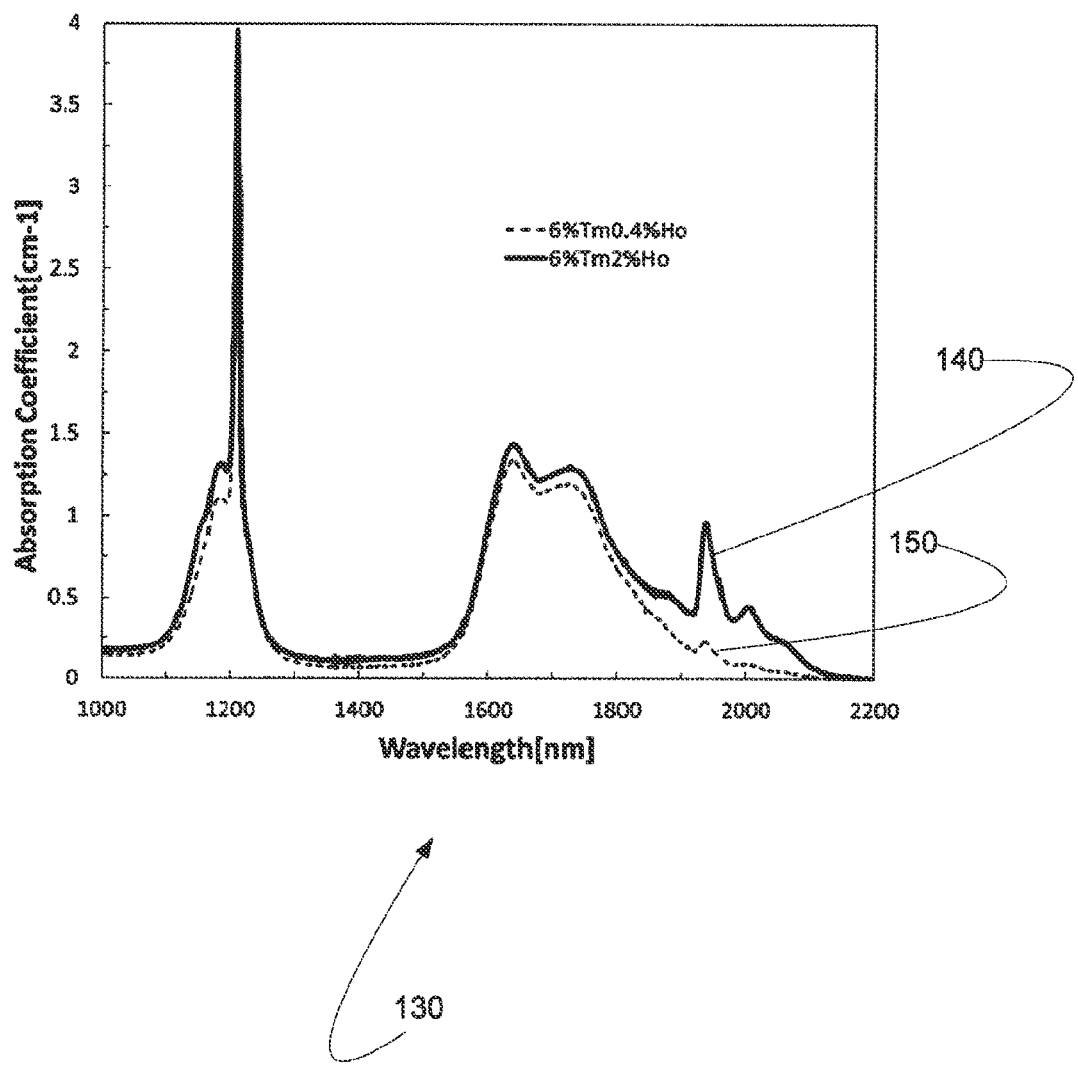
FIG. 1B illustrates absorption spectra of $Tm^{3+}/Ho^{3+}$ co-doped germanosilicate glasses with different doping concentrations.

Applicants have further fabricated germanosilicate glass with that is Ho$^{3+}$-doped or Tm$^{3+}$/Ho$^{3+}$ co-doped. FIG. 1B illustrates the absorption spectra 130 comprising spectrum 140 for a germanosilicate glass co-doped with 6 weight percent Tm$_2$O$_3$ and 0.4 weight percent Ho$_2$O$_3$ and spectrum 150 for a germanosilicate glass co-doped with 6 weight percent Tm$_2$O$_3$ and 2 weight percent Ho$_2$O$_3$. FIG. 1C illustrates the absorption spectra 160 comprising spectrum 170 for a germanosilicate glass comprising 1 weight percent Ho$_2$O$_3$ and spectrum 180 for a germanosilicate glass comprising 3 weight percent Ho$_2$O$_3$.

Figure 2:
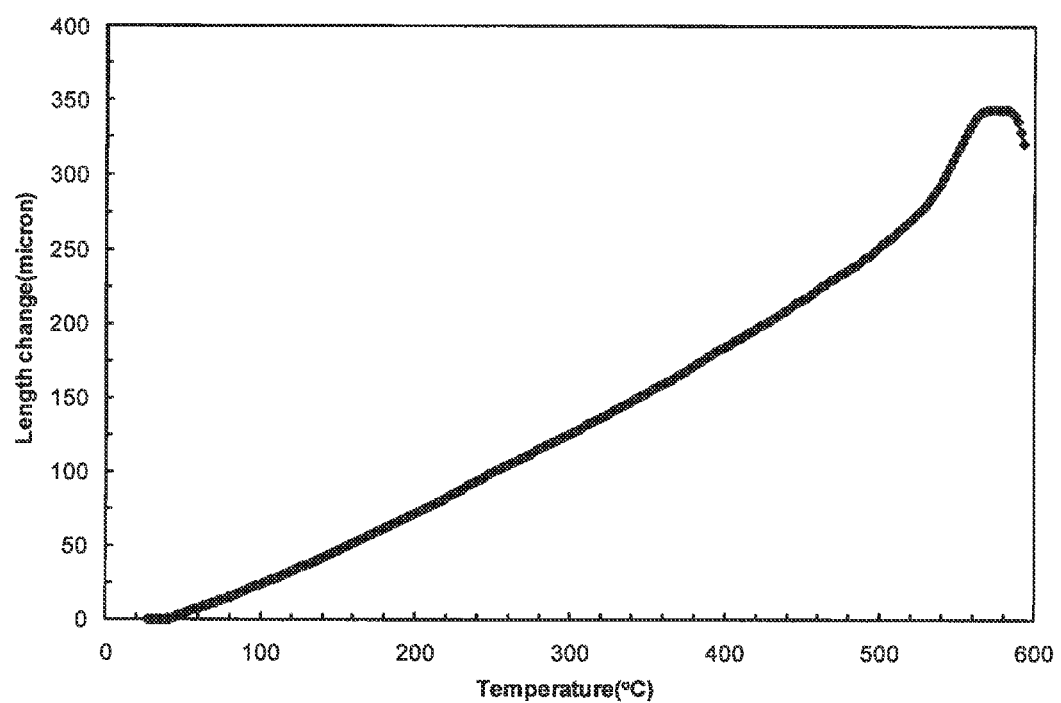
FIG. 2 illustrates thermal expansion curves of $Tm^{3+}$-doped germanosilicate glass.

Applicants have also fabricated undoped cladding glasses. As those skilled in the art will appreciate, cladding glasses must comprise a similar thermal expansion coefficient with respect to the doped core glass to ensure low mechanical and thermal stress in the fiber, and a lower refractive index compared to the core glass to form waveguide. FIG. 2 illustrates thermal expansion curves of Tm$^{3+}$-doped germanosilicate glass. As will be appreciated by those of ordinary skill in the art, as Applicants use the same or similar glass compositions for their Ho$^{3+}$-doped and Tm$^{3+}$/Ho$^{3+}$-co-doped germanosilicate glass, the thermal properties of these glasses are very similar to that depicted in FIG. 2.

Fiber preforms can be formed using doped core glass rod and undoped cladding glass tubes. Doped core glass rods are drilled from a bulk core glass using diamond core drill and the barrel of the rod is polished to a high surface quality. The undoped cladding glass tubes can be drilled from cladding glasses. Both inside and outside surfaces of the glass tubes are polished to a high surface quality. Tm$^{3+}$-doped germanosilicate glass fibers are then pulled using a fiber drawing tower.

Figure 4:
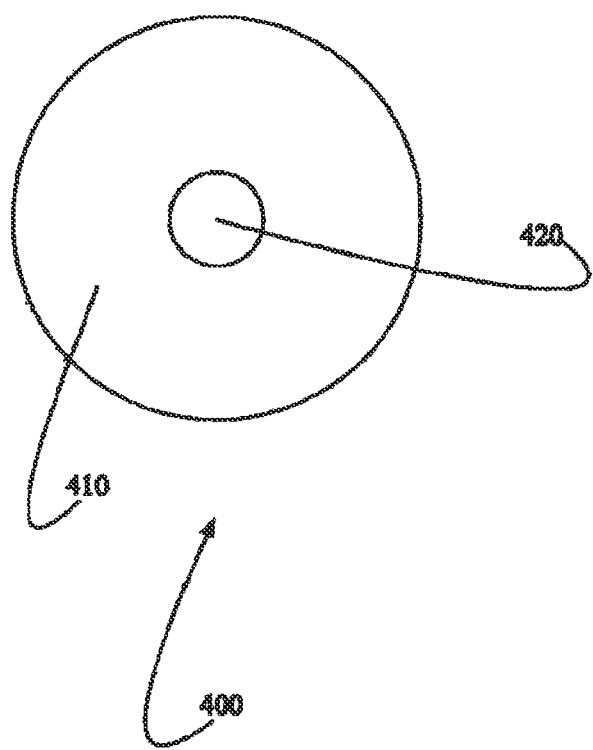
FIG. 4 shows a cross section view of single cladding $Tm^{3+}$-doped germanosilicate glass fiber.

FIG. 4 shows a fiber preform 400 comprising cladding 410 and core 420. In certain embodiments, the cladding diameter was about 229 microns, and the core diameter was about 41.5 microns.

Figure 5:
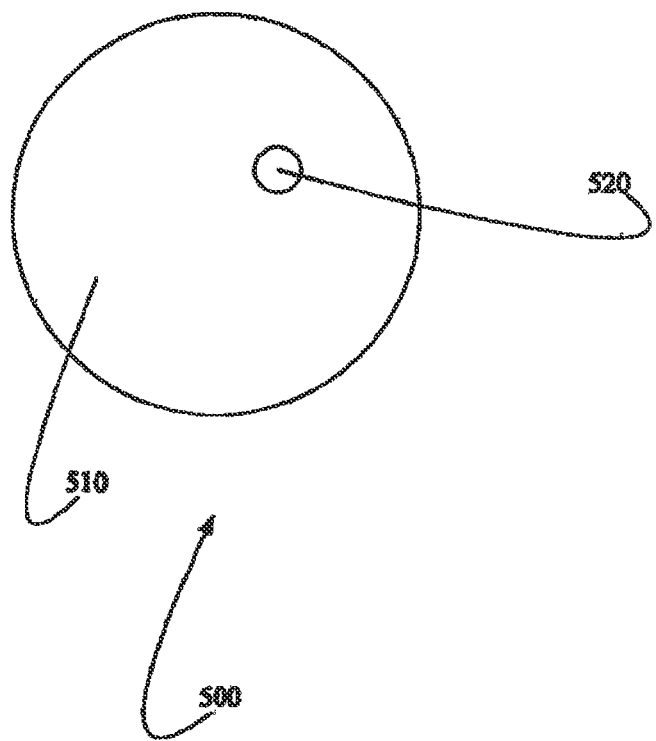
FIG. 5 shows a cross section view of on off-center single cladding $Tm^{3+}$-doped germanosilicate glass fiber.

FIG. 5 shows a fiber preform 500 comprising cladding 510 and off-center core 520. In certain embodiments, the cladding diameter was about 216 microns, and the core diameter was about 18.5 microns.

Figure 6:
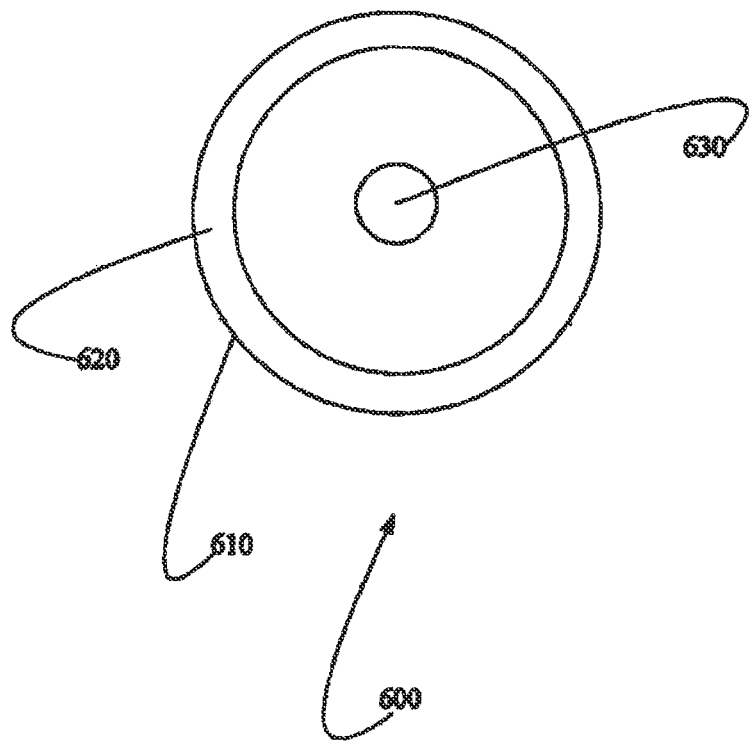
FIG. 6 shows a cross section view of doubling cladding $Tm^{3+}$-doped germanosilicate glass fiber.

FIG. 6 shows a fiber preform 600 comprising first cladding 610, second cladding 620, and core 630. In certain embodiments, the first cladding diameter was about 245 microns, the second cladding diameter was about 210 microns, and the core diameter was about 21.5 microns.

Figure 7:
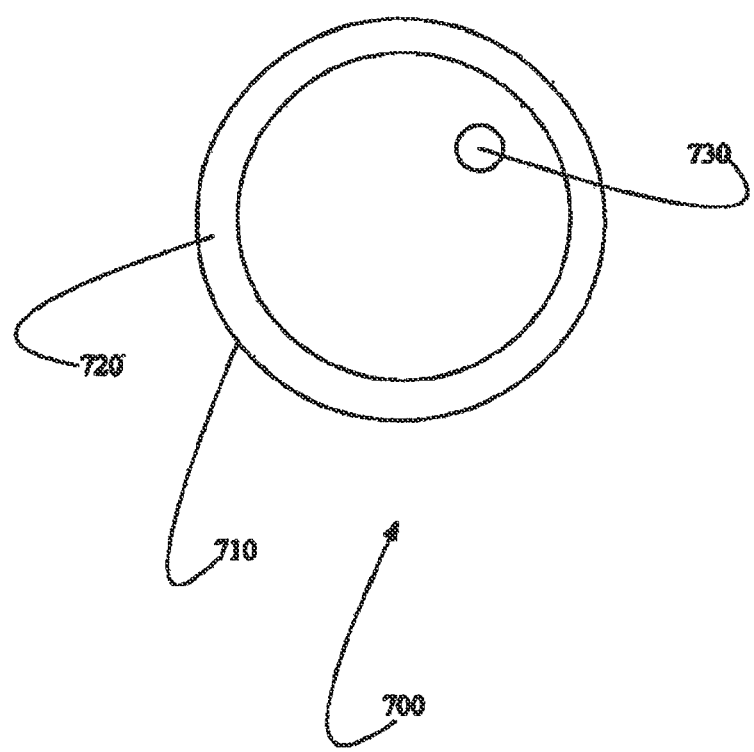
FIG. 7 shows a cross section view of on off-center double cladding $Tm^{3+}$-doped germanosilicate glass fiber.

FIG. 7 shows a fiber preform 700 comprising first cladding 710, second cladding 720, and off-center core 730. In certain embodiments, the first cladding diameter was about 231 microns, the second cladding diameter was about 195.5 microns, and the core diameter was about 20.5 microns.

Figure 8:
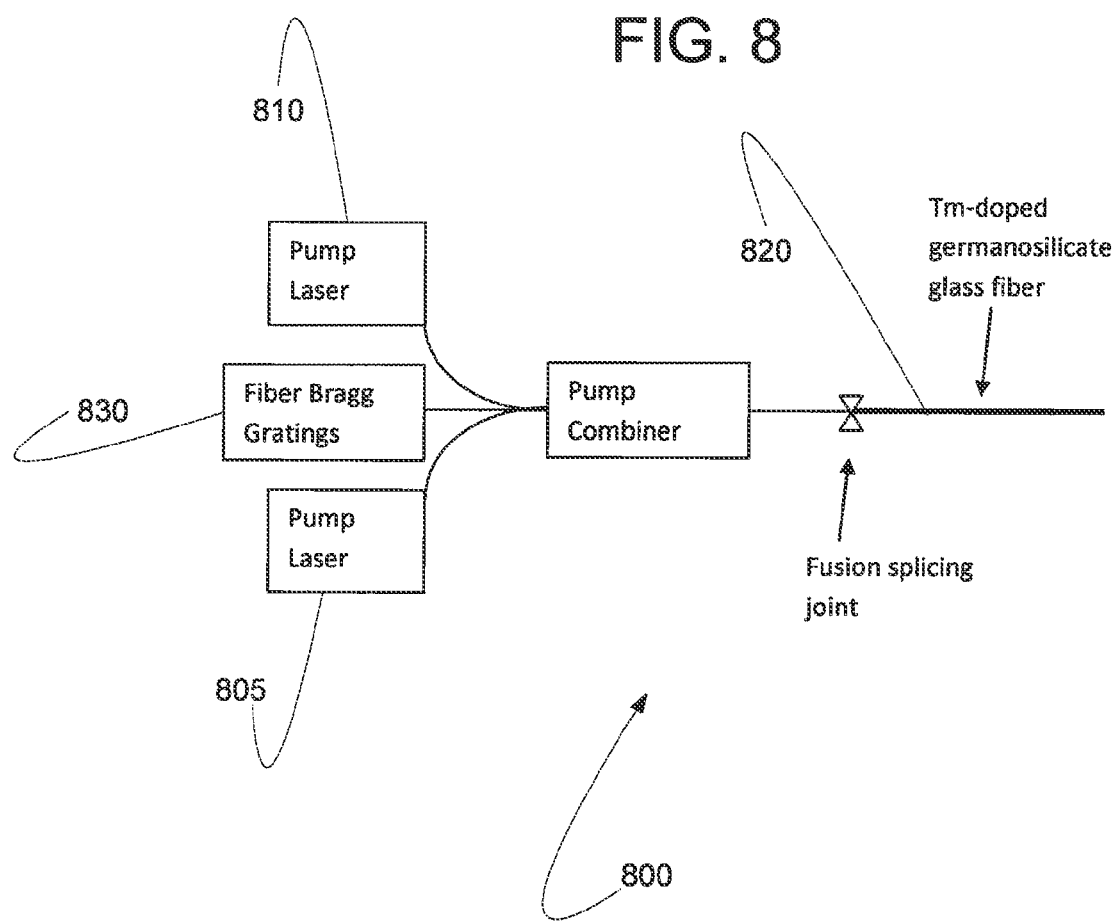
FIG. 8 is a block diagram showing Applicants' apparatus used for fiber laser characterization.

FIG. 8 illustrates apparatus 800 which can be used for fiber laser characterization. Fiber pigtailed multi-mode 790 nm diode lasers 805 and 810 are used as pump sources. The core of the pump laser delivery fiber is 125 micron. The delivery fiber of the pump laser is fusion spliced with a Tm-doped germanosilicate glass fiber 820. Fiber Bragg grating 830 is used as the high reflectivity mirror for the fiber laser cavity. Fresnel reflection of approximately 5% from the Tm$^{3+}$-doped germanosilicate glass fiber was used to form the fiber laser cavity.

FIG. 3 shows the fiber laser test results using apparatus 800 (FIG. 8) and F-Tm-24 fiber with different fiber lengths. The cross section view of F-Tm-24 fiber was shown in FIG. 7. Curve 310 was obtained using a 20 cm fiber length. Curve 320 was obtained using a 40 cm fiber length. Curve 330 was obtained using a 100 cm fiber length.

A slope efficiency of 40% was achieved in F-Tm-24 fiber with 100-cm fiber length. It should be noted that the slope efficiency depends heavily on the reflectivity of the output coupler. Here the reflectivity of the output coupler is fixed because apparatus 800 simply uses the Fresnel reflection of the output end of the fiber. The slope efficiency can be significantly improved by optimizing output coupler.

FIG. 9 illustrates the fiber laser performance using apparatus 800 (FIG. 8) and a 1.2 m germanosilicate glass fiber co-doped with 5 weight percent $Tm_2O_3$ and 0.4 weight percent $Ho_2O_3$.

While the preferred embodiments of the present invention have been illustrated in detail, it should be apparent that modifications and adaptations to those embodiments may occur to one skilled in the art without departing from the scope of the present invention as set forth in the following claims.

We claim:

1. A laser fiber to emit laser light from 1.7 micron to 2.2 micron comprising:
    a germanosilicate laser glass comprising:
        a first glass network former of $SiO_2$ from about 2.5 mole percent to about 70 mole percent;
        a second glass network former of $GeO_2$ from about 2.5 mole percent to about 70 mole percent, wherein a total mole percent of the first glass network former and the second glass network former is from about 30 mole percent to about 90 mole percent;
        a glass network modifier (MO) selected from BaO, CaO, MgO, ZnO, PbO, $K_2O$, $Na_2O$, $Li_2O$, $Y_2O_3$, or combinations thereof, from about 5 mole percent to about 40 mole percent;
        a glass network intermediator (XO) selected from $Al_2O_3$, $B_2O_3$, $La_2O_3$, or combinations thereof, from about 0.5 mole percent to about 40 mole percent; and
        a doping member selected from the group consisting of:
            Thulium oxide from about 2 weight percent to about 15 weight percent;
            Holmium oxide from about 0.1 weight percent to about 3 weight percent; and
            a combination of Thulium oxide from about 2 weight percent to about 15 weight percent and Holmium oxide from about 0.1 weight percent to about 3 weight percent.

2. The laser fiber of claim 1, wherein the doping member comprises Thulium oxide from about 4 weight percent to about 7 weight percent.

3. The laser fiber of claim 1, wherein the doping member comprises Holmium oxide doping from about 0.4 weight percent to about 2 weight percent.

4. The laser fiber of claim 1, wherein the doping member comprises a combination of Thulium oxide from about 4 weight percent to about 7 weight percent and Holmium oxide from about 0.2 weight percent to about 2 weight percent.

5. The laser fiber of claim 1, comprising:
    the first network former from about 2.5 mole percent to about 50 mole percent; and
    the second network former from about 4.25 mole percent to about 60 mole percent, wherein the total mole percent of the first glass network former and the second glass network Former is from about 45 mole percent to 70 mole percent.

6. A fiber lasing device to emit laser light from 1.7 micron to 2.2 micron comprising:
    a pump for emitting pump light from 750 nm to 850 nm; and
    a fiber laser cavity containing a delivery fiber formed of a Thulium-doped germanosilicate laser glass, the laser glass comprising:
        a first glass network former of $SiO_2$ from about 2.5 mole percent to about 70 mole percent;
        a second glass network former of $GeO_2$ from about 2.5 mole percent to about 70 mole percent, wherein a total mole percent of the first glass network former and the second glass network former is from about 30 mole percent to about 90 mole percent;
        a glass network modifier (MO) selected from BaO, CaO, MgO, ZnO, PbO, $K_2O$, $Na_2O$, $Li_2O$, $Y_2O_3$, or combinations thereof, from about 5 mole percent to about 40 mole percent;
        a glass network intermediator (XO) selected from $Al_2O_3$, $B_2O_3$, $La_2O_3$, or combinations thereof, from about 0.5 mole percent to about 40 mole percent; and
        a doping member selected from the group consisting of:
            Thulium oxide from about 2 weight percent to about 15 weight percent;
            Holmium oxide from about 0.1 weight percent to about 3 weight percent; and
            a combination of Thulium oxide from about 2 weight percent to about 15 weight percent and Holmium oxide from about 0.1 weight percent to about 3 weight percent.

7. The fiber lasing device of claim 6, wherein the doping member comprises Thulium oxide from about 4 weight percent to about 7 weight percent.

8. The fiber lasing device of claim 6, wherein the doping member comprises Holmium oxide doping from about 0.4 weight percent to about 2 weight percent.

9. The fiber lasing device of claim 6, wherein the doping member comprises a combination of Thulium oxide from about 4 weight percent to about 7 weight percent and Holmium oxide from about 0.2 weight percent to about 2 weight percent.

10. The fiber lasing device of claim 6, wherein the laser glass further comprises:
    the first network former from about 2.5 mole percent to about 50 mole percent; and
    the second network former from about 4.25 mole percent to about 60 mole percent, wherein the total mole percent of the first glass network former and the second glass network former is from about 45 mole percent to 70 mole percent.

* * * * *